US009481785B2

(12) United States Patent
Song et al.

(10) Patent No.: US 9,481,785 B2
(45) Date of Patent: Nov. 1, 2016

(54) FINELY DIVIDED, CATIONIC OR AMPHOTERIC, AQUEOUS POLYMER DISPERSIONS, PROCESS FOR THEIR PREPARATION, THEIR USE, CATIONIC OR AMPHOTERIC PROTECTIVE COLLOIDS AND THEIR PREPARATION

(75) Inventors: Anja Song, Mannheim (DE); Holger Kern, Kirchardt (DE); Michele N. Williams-Harry, Northville, MI (US); Petra Arnold, Birkenau (DE); Simone Milazzo, Boebingen (DE)

(73) Assignee: BASF SE, Ludwigshafen (DE)

( * ) Notice: Subject to any disclaimer, the term of this patent is extended or adjusted under 35 U.S.C. 154(b) by 147 days.

(21) Appl. No.: 13/988,527

(22) PCT Filed: Nov. 22, 2011

(86) PCT No.: PCT/EP2011/070655
§ 371 (c)(1),
(2), (4) Date: May 21, 2013

(87) PCT Pub. No.: WO2012/069460
PCT Pub. Date: May 31, 2012

(65) Prior Publication Data
US 2013/0245168 A1 Sep. 19, 2013

Related U.S. Application Data

(60) Provisional application No. 61/417,245, filed on Nov. 25, 2010.

(30) Foreign Application Priority Data

Nov. 25, 2010 (EP) .................................... 10192551

(51) Int. Cl.
| | |
|---|---|
| C08L 33/08 | (2006.01) |
| C08F 2/28 | (2006.01) |
| C08F 220/14 | (2006.01) |
| C09D 4/06 | (2006.01) |
| D21H 17/34 | (2006.01) |
| D21H 21/16 | (2006.01) |
| C08F 257/02 | (2006.01) |
| C08L 33/14 | (2006.01) |

(52) U.S. Cl.
CPC .................. *C08L 33/08* (2013.01); *C08F 2/28* (2013.01); *C08F 220/14* (2013.01); *C08F 257/02* (2013.01); *C08L 33/14* (2013.01); *C09D 4/06* (2013.01); *D21H 17/34* (2013.01); *D21H 21/16* (2013.01)

(58) Field of Classification Search
CPC ... C08F 257/02; C08F 220/10; C08F 220/14
USPC ........................................................ 524/111
See application file for complete search history.

(56) References Cited

U.S. PATENT DOCUMENTS

| | | | |
|---|---|---|---|
| 4,051,093 A | 9/1977 | Wendel et al. | |
| 4,414,370 A | 11/1983 | Hamielec et al. | |
| 4,529,787 A | 7/1985 | Schmidt et al. | |
| 4,546,160 A | 10/1985 | Brand et al. | |
| 6,346,590 B1 | 2/2002 | Campbell et al. | |
| 6,552,144 B1 | 4/2003 | Campbell et al. | |
| 6,605,681 B1 | 8/2003 | Villalobos et al. | |
| 7,579,414 B2 * | 8/2009 | Kukula et al. | 526/65 |
| 8,901,227 B2 * | 12/2014 | Song et al. | 524/460 |
| 2008/0039598 A1 * | 2/2008 | Kukula et al. | 526/65 |
| 2011/0027602 A1 | 2/2011 | Scheerder et al. | |
| 2012/0083563 A1 * | 4/2012 | Song et al. | 524/460 |
| 2013/0245168 A1 * | 9/2013 | Song et al. | 524/111 |

FOREIGN PATENT DOCUMENTS

| | | |
|---|---|---|
| DE | 24 52 585 | 5/1976 |
| EP | 0 288 763 | 11/1988 |
| WO | 2005 003185 | 1/2005 |
| WO | 2008 071690 | 6/2008 |
| WO | 2009 007232 | 1/2009 |
| WO | 2010 139683 | 12/2010 |

OTHER PUBLICATIONS

Styrene/butyl acrylate price comparison. Obtained from Alibaba. com on Dec. 28, 2014. No Author.*
"Amphoteric". Obtained from IUPAC Gold Book http://goldbook.iupac.org/A00306.html on Dec. 28, 2014. No Author.*
U.S. Appl. No. 14/356,530, filed May 6, 2014, Seyffer, et al.
U.S. Appl. No. 14/375,937, filed Jul. 31, 2014, Al-Hellani, et al.
International Search Report, issued Feb. 20, 2012 in PCT/EP11/70655, filed Nov. 22, 2011.

* cited by examiner

*Primary Examiner* — Michael A Salvitti
(74) *Attorney, Agent, or Firm* — Oblon, McClelland, Maier & Neustadt, L.L.P

(57) ABSTRACT

A finely divided, cationic or amphoteric, aqueous polymer dispersion which is obtainable by emulsion polymerization of ethylenically unsaturated monomers in the presence of a cationic or amphoteric protective colloid, wherein first the cationic or amphoteric protective colloid is prepared by polymerizing a monomer blend in the presence of at least one first polymerization initiator in an organic solvent, and is carried out in a pressurized reactor at a pressure of at least 1720 kPa and at a temperature of at least 150° C., which monomer blend comprises at least one ethylenically unsaturated monomer carrying an amine group, to provide a resin, then combining the resin, with an acid and water, to form the cationic or amphoteric protective colloid, thereafter carrying out an emulsion polymerization by introducing a monomer mixture into an aqueous medium containing said cationic or amphoteric protective colloid and at least one second polymerization initiator, wherein said monomer mixture comprises at least one ethylenically unsaturated water insoluble monomer. The composition is useful as a sizing agent for paper.

17 Claims, No Drawings

FINELY DIVIDED, CATIONIC OR AMPHOTERIC, AQUEOUS POLYMER DISPERSIONS, PROCESS FOR THEIR PREPARATION, THEIR USE, CATIONIC OR AMPHOTERIC PROTECTIVE COLLOIDS AND THEIR PREPARATION

CROSS REFERENCE TO RELATED APPLICATIONS

The present application is a 35 U.S.C. §371 national stage patent application of International patent application PCT/EP2011/070655, filed on Nov. 22, 2011, published as WO/2012/069460 on May 31, 2012, the text of which is incorporated by reference, and claims the benefit of the filing date of European application no. 10192551.9, filed on Nov. 25, 2010, and U.S. provisional application No. 61/417,245, filed on Nov. 25, 2010, the text of both of which is also incorporated by reference.

DESCRIPTION

The invention concerns finely divided, cationic or amphoteric, aqueous polymer dispersions that are obtainable by an aqueous emulsion polymerisation employing new cationic or amphoteric protective colloids. A process for the preparation of said finely divided, cationic or amphoteric, aqueous polymer dispersions is also claimed. The polymer dispersions thus prepared may be used as sizing agents for paper, board and cardboard. The invention also concerns the aforementioned new cationic or amphoteric protective colloids and their preparation.

Copolymeric aqueous dispersions that are obtainable by a two-step polymerisation in aqueous phase have been described in DE 24 52 585 A1. For this, a copolymer is first polymerised in aqueous phase from a monomer containing acid groups and an ethylenically unsaturated monomer with a tertiary or quaternary amino group or a nitrogen containing heterocyclic group, and then copolymerising further with styrene and/or acrylonitrile and, if applicable, a (meth) acrylic ester, and additional olefinically unsaturated monomers are added and polymerised, if applicable. The polymer dispersions produced in this way are used as sizing agents for paper.

WO 08/071,690 A1 describes an additional fine particle, cationic polymer dispersion, which is used as a sizing agent for paper, board and cardboard. The two-step process first produces a prepolymer from (meth) acrylic ester, optionally styrene and/or (meth) acrylonitrile, and ethylenically unsaturated carboxylic acid or carboxylic anhydride, and optionally an ethylenically unsaturated monomer distinct from the other monomers. An aqueous solution of the pre-polymer is subsequently converted by emulsion polymerisation with (meth)acrylonitrile, a $C_1$- to $C_4$-alkyl ester of (meth) acrylic acid, a $C_6$- to $C_{14}$-alkyl ester of (meth) acrylic acid and optionally other monomers.

WO 2010/139683, unpublished at the date of filing, describes finely divided, cationic, aqueous polymer dispersions obtainable by a two-stage polymerisation. This involves preparing a cationic prepolymer dispersant in a first polymerisation stage and thereafter an emulsion polymerisation is carried out in an aqueous solution of this pre-polymer in the presence of ethylenically unsaturated monomers. The polymer dispersions are used as sizing agents for paper, board and cardboard and demonstrate improved efficiency by comparison with known polymer dispersions. However, this product requires that the cationic pre-polymer dispersant is prepared in situ immediately before carrying out the emulsion polymerisation.

It is known to provide dispersions of solid oligomeric resins. Such oligomeric resins are sometimes referred to as solid grade oligomers (SGO). The following are disclosures of typical processes for preparing solid grade oligomers.

U.S. Pat. No. 4,414,370 discloses a process of continuous bulk polymerization of vinyl monomers by thermal initiation with molar masses up to 1000-6000 g/mol. The process is carried out at temperatures between 235 and 310° C. and in durations of at least 2 minutes to 45 minutes in a continuous reactor containing a resin melt mixture of unreacted vinyl-containing monomer and the resulting polymer. A mixture of at least one monoalkylene aromatic monomer and at least one acrylate-containing monomer is used for the monomer, wherein the focus is on styrene or a mixture of styrene and alpha-methylstyrene as well as acrylic acid of 1:2 to 2:1. The mixture of vinyl-containing monomers also contains 1-20% of a solvent such as diethylene glycol monoethyl ether. The process of polymerization is carried out in a continuous stirred tank reactor. This process produces polymers of relatively uniform molecular weight.

U.S. Pat. No. 4,529,787 describes the process for continuous bulk polymerization of vinylic monomers to form low molecular weight polymers having a narrow molar mass distribution, a high solids content and also a low chromophore content. The polymerization is carried out continuously in the presence of initiators present in the ratio of 0.0005:1 to 0.04:1 relative to the monomers, in a high-boiling solvent. The monomers used are at least one monoalkenylic aromatic monomer and at least one acrylate-containing monomer. Preference is given to a monomer mixture consisting of 37 parts of styrene, 38 parts of 2-ethylhexylacrylate and 25 parts of hydroxymethacrylate.

U.S. Pat. No. 4,546,160 describes the process for continuous bulk polymerization of vinylic monomers to form low molecular weight polymers ($M_n$=1000-25,000 g/mol) having a narrow molar mass distribution in the range from 1.5 to 3. The polymerization is carried out continuously in the presence of initiators present in a ratio of 0.0005:1 to 0.06:1 relative to the monomers, in a solvent, using residence times of 1 to 30 minutes, at reaction temperatures of 180 to 270° C. The amount of solvent used is between 0 and 25% based on the weight of the acrylate-containing monomers. The monomer used is a mixture consisting of functional acrylate-containing monomers, examples being hydroxyalkyl acrylate or hydroxyalkyl methacrylate, and nonfunctional acrylate-containing monomers, for example alkyl esters of acrylic acid or methacrylic acid. Preference is given to a monomer mixture consisting of 37 parts of styrene, 38 parts of 2-ethylhexyl acrylate and 25 parts of hydroxymethacrylate.

U.S. Pat. No. 6,346,590 describes a high-temperature polymerization and subsequent condensation process for modifying a polymeric product that is carried out in one to two continuous reactors. The monomers used have at least one polymerizable and at least one functionalizable group and they are polymerized using a certain temperature profile. Preferred functional groups for condensation are carboxyl, ester, anhydride, epoxy, amine, ketone, aldehyde or isocyanate groups.

U.S. Pat. No. 6,552,144 B1 describes a continuous high-temperature process for preparing gel-free polymers at temperatures between 190 and 270° C. The process comprises continuously pumping into the reactor at least one monomer such that the reactor is filled to 100% of its usable volume.

The reactor is maintained at a particular temperature for a particular period to cause conversion of the monomer into a polymer such that the polymer formed is free of gel particles. The monomers used are preferably OH-containing acrylates and also methacrylates, and they are preferably copolymerized with glycidyl methacrylate (GMA).

U.S. Pat. No. 6,605,681 B1 describes a continuous high-temperature process for preparing an epoxy-containing polymer via free-radical polymerization. The process comprises pumping at least one epoxy-bearing acrylate monomer and also at least one further nonfunctional monomer suitable for free-radical polymerization continuously into the reactor. A free-radical polymerization initiator may be optionally added. The reactor is maintained at a particular temperature for a particular period to cause conversion of the monomer into a polymer such that the polymer formed is free of gel particles. The polymers formed can be used as a constituent part of a transparent coating having a low Delta b value under standard conditions.

WO 2005/003185 describes a high-temperature high-pressure process for producing oligomers. The process comprises transferring hybrid reactor mixtures consisting of one or more hybrid reactor monomers and one or more hybrid reactor initiators to one or more hybrid reactors. Similarly, the products of the hybrid reactor can be transferred in this process into one or more bulk polymerization reactors in order that polymerization may be completed therein under effective bulk polymerization temperatures and pressures. The process makes it possible to control the polydispersity and the molar mass of the polymer formed. The polymers thus produced can then be used as binders in coating systems for automotive OEM and refinish applications with particular coating properties.

WO09007232 describes the production of an aqueous coating system which consists of a cationic vinyl-containing oligomer and is used for coating wood substrates indoors and outdoors. The cationic vinyl-containing oligomer can be prepared not only in solution polymerization but also in bulk polymerization by reaction of 2-50% by weight vinylic monomers with 20-98% by weight of $C_1$-$C_{18}$ alkyl methacrylates. The possible vinylic monomers can be subdivided into three groups: nonionic monomers having amine-containing functional groups; monomers having permanently quaternary ammonium groups; monomers having neutralized amine groups; and also mixtures thereof. An emulsion polymerization can also be carried out in the presence of the cationic oligomer.

None of the aforementioned disclosures of solid grade oligomers describe cationic or amphoteric protective colloids that are used in the preparation of aqueous dispersions of polymeric sizing agents in the paper industry.

There is a continued need in the paper industry for novel, more effective internal sizing agents and surface sizing agents for the production of paper, board and cardboard.

It was an object of the present invention to provide further polymer dispersions which have an improved efficiency as paper sizing agents compared with known polymer dispersions. It would also be desirable to provide polymeric dispersions suitable as sizing agents by a more convenient and cost-effective route.

The objective of the present invention is achieved by providing a finely divided, cationic or amphoteric, aqueous polymer dispersion which is obtainable by emulsion polymerisation of ethylenically unsaturated monomers in the presence of a cationic or amphoteric protective colloid, wherein first the cationic or amphoteric protective colloid is prepared in the presence of at least one first polymerisation initiator in an organic solvent, and is carried out in a pressurised reactor at a pressure of at least 1720 kPa and at a temperature of at least 150° C., which monomer blend comprises at least one ethylenically unsaturated monomer carrying an amine group,
to provide a resin, then combining the resin, with an acid and water to form the cationic or amphoteric protective colloid, thereafter carrying out an emulsion polymerisation by introducing a monomer mixture into an aqueous medium containing said cationic or amphoteric protective colloid and at least one second polymerisation initiator, wherein said monomer mixture comprises at least one ethylenically unsaturated water insoluble monomer.

By water-insoluble we mean that the monomer has a solubility in water of less than 5 g in 100 ml water at 25° C.

The present invention also includes the aforementioned cationic or amphoteric protective colloid obtainable by polymerisation of the monomer blend comprising components at least one ethylenically unsaturated monomer carrying an amine group, to form a resin, then combining the resin, with an acid and water to form the cationic or amphoteric polymeric protective colloid.

The term resin in the present case is generally regarded as the material resulting from the polymerisation of the monomer blend. As such the resin will contain amine groups which are essentially not protonated and therefore not cationic. The cationic or amphoteric protective colloid is regarded as the product which results having been treated by acid and in which the amine groups are protonated and therefore cationic. In the case of an amphoteric protective colloid an anionic monomer is employed in addition to the one containing amine groups. The cationic or amphoteric, aqueous polymer dispersion is regarded as comprising an aqueous continuous phase and a dispersed phase of particles having a polymeric core with the cationic or amphoteric protective colloid disposed at the surface of the polymeric core.

Polymeric dispersions produced according to the invention are found to be very efficient sizing agents in the manufacture of paper and paperboard. Furthermore, the products do not require providing a protective colloid which must be made in situ immediately prior to the emulsion polymerisation. In fact the present process allows the preparation of the cationic or amphoteric protective colloid separately and possibly as a large batch which may be used for multiple separate emulsion polymerisation reactions for the preparation of the finely divided cationic or amphoteric polymer dispersions. In this way the protective colloid or even the resin may be produced in bulk and then stored for future use in the preparation of the polymer dispersion by aqueous emulsion polymerisation. Desirably, the resin can be produced by polymerisation of the monomer blend in a separate reaction vessel from the subsequent emulsion polymerisation of the monomer mixture in the preparation of the finely divided, cationic or amphoteric, aqueous polymer dispersion. Since the protective colloid does not have to be made immediately prior to the emulsion polymerisation, the emulsion polymerisation production runs can be operated consecutively, which means increases the production capacity for producing the finely divided, cationic or amphoteric, aqueous polymer dispersion. This elegant process for making said polymer dispersion is therefore a more convenient in addition to being more cost-effective.

Desirably the resin may be formed by polymerisation of
(a) from 0.1 to 99.9% by weight of at least one ethylenically unsaturated aromatic monomer;

(b) from 0.1 to 99.9% by weight of at least one ethylenically unsaturated monomer carrying an amine group;
(c) from 0 to 5% by weight of at least one ethylenically unsaturated monomer comprising an acid group; and
(d) from 0 to 20% by weight of at least one non-ionic, ethylenically unsaturated monomer different from (a),
the sum of (a)+(b)+(c)+(d) being 100% by weight, Preferably the ethylenically unsaturated aromatic monomer is an optionally substituted styrene.

Preferably resin is formed by polymerisation of
(a) from 40 to 90% by weight of at least one optionally substituted styrene;
(b) from 10 to 60% by weight of at least one ethylenically unsaturated monomer carrying an amine group;
(c) from 0 to 5% by weight of at least one ethylenically unsaturated monomer comprising an acid group; and
(d) from 0 to 20% by weight of at least one non-ionic, ethylenically unsaturated monomer different from (a),
the sum of (a)+(b)+(c)+(d) being 100% by weight, In the preferred form the resin may be formed from the aforementioned monomer components in which optionally substituted styrenes, such as styrene, α-methylstyrene or ethyl styrene, used as monomers of group (a). The monomers of group (a) are desirably present in an amount from 40 to 90% by weight, preferably from 50 to 85% by weight, more preferably from 60 to 80% by weight, in particular between 70 and 78% by weight, and more particularly between 72 and 78% by weight, in the monomer mixture comprising (a) to (d).

In general monomers of group (b) may be any suitable ethylenically unsaturated monomer which carries an amino group.

Typical compounds having an amino group of those of general formula (I):

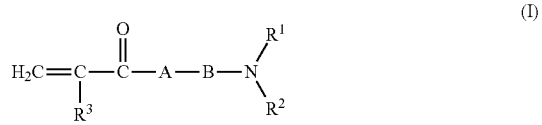

In which
A is O, NH,
B is $C_nH_{2n}$, where n is an integer in the range from 1 to 8,
$R_1$, $R_2$ are $C_mH_{2m+1}$, where m is an integer in the range from 1 to 4, and
$R_3$ is H, $CH_3$.

The compounds of formula (I) are designated as a rule as cationic as basic monomers. Basic, ethylenically unsaturated monomers are, for example, acrylates and methacrylates of amino alcohols, e.g. N,N-dimethyl amino ethyl acrylate, N,N-dimethyl amino ethyl methacrylate, N,N-diethyl amino ethyl acrylate, N,N-diethyl amino ethyl methacrylate, N,N-dimethyl amino propyl acrylate, N,N-dimethyl amino propyl methacrylate, N,N-dibutyl amino propyl acrylate, N,N-dibutylamino propyl methacrylate, N,N-dimethyl amino neopentyl acrylate, derivatives of acrylamide or of methacrylamide which comprise amino groups, such as N,N-dimethyl amino ethyl acrylamide, N,N-dimethyl amino ethyl methacrylamide, N,N-dimethyl amino propyl methacrylamide.

Preferably, the monomers of group (b) are selected from N,N-dimethyl amino propyl methacrylamide, N,N-dimethylaminoethyl methacrylate and N,N-dimethylaminoethyl acrylate. Where the monomer is quaternised a preferred quaternising agent is methyl chloride.

The monomers of group (b) desirably may be used in the preparation of the aforementioned resin in an amount of from 10 to 60% by weight, preferably from 15 to 50% by weight, more preferably, 15 to 40% by weight, more preferably still from 20 to 35% by weight, in particular between 22 and 30% by weight, more particularly between 22 and 28% by weight, based on the monomer mixture (a) to (d).

Examples of monomers of group (c) are ethylenically unsaturated $C_3$- to $C_6$-carboxylic acids, such as acrylic acid, methacrylic acid, maleic acid, fumaric acid, itaconic acid, ethacrylic acid, crotonic acid, monoesters of ethylenically unsaturated dicarboxylic acids, such as mono methyl maleate, mono methyl fumarate, mono ethyl maleate, mono ethyl fumarate, mono propyl maleate, mono propyl, fumarate, mono-n-butyl maleate, mono-n-butyl fumarate, and styrene carboxylic acids and ethylenically unsaturated anhydrides, such as maleic anhydride and itaconic anhydride. Depending on the water content of the solvent used in the first polymerisation stage, the anhydride group of monomers may be hydrolysed to carboxyl groups. In addition, monomers comprising sulpho- and/or phosphonic acid groups, such as 2-acrylamido-2-methyl propane sulphonic acid and vinyl phosphonic acid, are suitable as monomers (c). The monomers comprising acid groups can be used in the form of free acid groups and in the form of partly or completely neutralised with alkali metal bases, alkaline earth metal bases, ammonia and/or amines. For example, sodium hydroxide solution, potassium hydroxyide solution, sodium carbonate, sodium bicarbonate, ammonia, trimethyl amine, triethyl amine, morpholine, ethanolamine, diethanolamine, triethanolamine, or diethylene triamine is used for neutralising the acid groups of the monomers. It is of course possible to use two or more bases as neutralising agents.

From this group of monomers, acrylic acid and methacrylic acid or mixtures of acrylic acid and methacrylic acid in any desired ratio are preferably used. The monomers of group (c) are present in an amount of from 0 to 5% by weight. Desirably these monomers may be included in an amount of from 0.5 to 5% by weight, suitably from 0.7 to 3.5% by weight, for instance between 1.5 and 2.5% by weight, such as around 2% by weight, in the monomer mixture comprising (a) to (d).

Component (d) of the monomer mixture used for the preparation of the above mentioned resin can, if appropriate, comprise non-ionic, ethylenically unsaturated monomers which are different from the monomers (a). Examples of such monomers are amides, such as, for example, acrylamide, methacrylamide, N-methyl acrylamide, N-methyl methacrylamide, N-ethyl acrylamide and N-ethyl methacrylamide; vinyl compounds, such as vinyl acetate, vinyl propionate or vinylformamide; $C_{1-30}$ alkyl (meth) acrylates. The alkyl moiety of the ester may contain between 1 and 9 carbon atoms, such as, for example, methyl acrylate, methyl methacrylate, ethyl acrylate, ethyl methacrylate, propyl acrylate, propyl methacrylate, isopropyl acrylate, isopropyl methacrylate, n-butyl acrylate, isobutyl acrylate, tert butyl acrylate, n-butyl methacrylate, isobutyl methacrylate, tert butyl methacrylate, hexyl acrylate, hexyl methacrylate, ethylhexyl acrylate, ethylhexyl methacrylate, cyclohexyl acrylate, cyclohexyl methacrylate. However, it may be desirable to employ esters in which the alkyl moiety as at least 10 carbon atoms, for instance between 10 and 24 carbon atoms. Suitable compounds include decyl acrylate, for instance n-decyl acrylate, decyl methacrylate, for instance n-decyl methacrylate, undecyl acrylate, undecyl methacrylate, dodecyl acrylate, for instance n-dodecyl acrylate (lauryl acrylate), dodecyl methacrylate, for instance n-dodecyl methacrylate (lauryl methacrylate), tridecyl acrylate, tridecyl methacrylate, tetradecyl acrylate, tetradecyl methacrylate, pentadecyl acrylate, pentadecyl methacrylate, hexadecyl acrylate, hexadecyl methacrylate, heptadecyl acrylate, heptadecyl methacrylate, octadecyl acrylate, such as n-octadecyl acrylate (stearyl acrylate), octadecyl methacrylate, such as n-octadecyl acrylate (stearyl acrylate), nonadecyl acrylate, non-adecyl methacrylate, cosyl acrylate, cosyl methacrylate, eicosyl acrylate, eicosyl methacrylate, docosyl acrylate, docosyl methacrylate, tricosyl acrylate, tricosyl methacrylate, tetracosyl acrylate, tetracosyl methacrylate or mixtures thereof. Alternatively the esters of acrylic acid or methacrylic acid having been prepared by reacting at least one ethylene oxide unit, for example hydroxylethyl methacrylate or diethylene glycol monomethacrylate. Other suitable monomers of this group include acrylonitrile and methacrylonitrile. It is of course also possible to use mixtures of said monomers. If the monomers group (d) are used, they are present in an amount of up to 20% by weight, in general in an amount of up to 10% by weight, for instance in an amount of up to 5% by weight, based on the total amount of monomers (a) to (d) in the monomer mixture. Desirably these monomers may be included in an amount of from 0.5 to 5% by weight, suitably from 0.7 to 3.5% by weight, in the monomer mixture comprising monomers (a) to (d) in the monomer mixture.

The sum of the values in % by weight for the monomers (a) to (d) is always 100.

Preferred finely divided, cationic or amphoteric polymer dispersions are those in which the protective colloid is obtainable by reacting the resin with acid, optionally followed by addition of water, wherein the resin is obtainable by polymerisation of monomer mixture:

(a) from 40 to 90% by weight of styrene;
(b) from 10 to 60% by weight of at least one compound selected from N,N-dimethylaminopropylmethacrylamide, N,N-dimethylaminoethyl methacrylate and N,N-dimethylaminoethyl acrylate;
(c) from 0 to 5% by weight of acrylic acid and/or methacrylic acid;
(d) from 0 to 5% by weight of stearyl acrylate.

More preferably the monomer mixture comprises:

(a) from 50 to 80% by weight, preferably 60 to 78% by weight, particularly from 72 to 78% by weight of styrene;
(b) from 30 to 50% by weight, preferably from 20 to 35% by weight, in particular from 22 to 28% by weight of at least one compound selected from N,N-dimethylaminopropylmethacrylamide, N,N-dimethylaminoethyl methacrylate and especially N,N-dimethylaminoethyl acrylate; and
(c) from 0 to 3% by weight, such as 1.5 to 2.5% by weight of acrylic acid or methacrylic acid.

A particularly useful composition is formed from a monomer mixture comprising about 22% by weight N,N-dimethylaminoethyl acrylate and about 78% by weight styrene.

An alternative preferred monomer mixture comprises:

(a) from 60 to 74.5% by weight of styrene;
(b) from 25 to 37% by weight of at least one compound selected from N,N-dimethylaminopropylmethacrylamide, N,N-dimethylaminoethyl methacrylate and especially N,N-dimethylaminoethyl acrylate;
(d) from 0.5 to 3% by weight of stearyl acrylate or other acrylates or methacrylates such as tertiary butyl acrylate or methacrylate, or, n-butyl acrylate or methacrylate or any of the other aforementioned acrylate or methacrylate esters indicated for component (d).

In the formation of the resin, the monomers (a) to (d) are polymerised in an organic solvent in which the monomer blend is soluble or at least miscible or dispersible. Preferably the monomer blend is soluble in the organic solvent. By soluble we mean that at least 5 g of the monomer blend will dissolve in 100 ml of the organic solvent at a temperature of 25° C.

Suitable solvents should have a high boiling temperature, for instance above 100° C., when measured at 1 atm pressure (101.33 kPa). The boiling point may be as high as 150° C. or higher and even as high as 180° C. or higher. Preferred solvents include alcohols with at least six carbon atoms and aromatic solvents. Examples of preferred solvents include isooctanol, 1-hexanol or xylene.

The polymerisation reaction may be carried out in any suitable closed reactor suitably under conditions of high pressure. Typically the polymerisation will be carried out at a pressure of at least 1720 kPa (249.46 pounds per square inch (psi)). Preferably the pressure may be within the range of 2065 to 2415 kPa (299.50 to 350.27 psi). A suitable reactor includes the reactors described in U.S. Pat. No. 6,605,681.

It will generally be desirable to conduct the reaction at high temperatures, for instance at least 150° C. and as high as 250° C. Typically the reaction will be conducted at a temperature of at least 170° C. or at least 180° C. Desirable temperature ranges include between 180° C. and 230° C. Preferably the reaction will be conducted at temperatures between 185 and 220° C. Usually the reaction medium will be maintained at a constant temperature for the duration of the polymerisation.

It is particularly preferred that the resin is produced under conditions of high-pressure and high-temperature as given above.

The reaction may require as little as one minute or in some cases as much as one hour or more. A typical residence time in the reactor may be between 2 and 40 minutes.

Suitable first polymerisation initiators for producing the resin include organic and inorganic peroxides, desirably with a half life of at least 10 hours at 100° C., for instance at least 16 hours and sometimes as much as 25 or 30 hours or more. Other initiators with similar half lives may also be used. Examples of desirable initiators include di-tert-butyl peroxide and di-tert-amyl peroxide.

The resin may be produced by a batch process but preferably is produced by a continuous process. Desirably at the end of the polymerisation reaction the reaction product can be passed through a devolatilisation zone to remove the organic solvent. Generally the resin will tend to be a solid at 25° C.

By this method resin may be obtained which exhibits a molar mass (Mw) of the resin may be in the range of between 2000 and 100,000 g/mol. Molar mass is desirably determined using gel permeation chromatography (GPC) at 22° C. The mobile phase should include the use of a mixture of 1% of triethanolamine in THF, as well as three highly crosslinked polystyrene-polydivinylbenzene columns (2× PLgel 10 μm as bed 300×7.5 mm and also 1× Plgel 10 μm). An RI detector system (Waters 2414) may be used. Polystyrene standards can be used to determine molar mass.

In order to prepare the cationic or amphoteric protective colloid from the resin, the resin should be combined with an acid and water. Typical acids include any inorganic acid such as sulphuric acid, hydrochloric acid, nitric acid or phosphoric acid. However, it is preferred to combine the resin with an organic acid and especially a carboxylic acid.

Suitable acids for this purpose include carboxylic acids containing between one and six carbon atoms. More preferred acids include formic acid or acetic acid.

The acid will react with the basic nitrogen groups in the amine monomer units of the resin such that the nitrogen atoms become protonated and therefore cationic. Water should also be combined with the resin or the so formed cationic or amphoteric protective colloid to allow the so formed cationic or amphoteric protective colloid to either dissolve and form an aqueous solution and/or form a colloidal dispersion in the aqueous medium. In some cases a portion of the cationic or amphoteric protected colloid may dissolve and a portion may form a colloidal dispersion. Cationic or amphoteric protective colloids containing a relatively higher content of amine monomer component (b) tend to be more soluble and therefore at least a larger proportion of the cationic or amphoteric protective colloid would tend to dissolve to form a solution, the remainder becoming a colloidal dispersion. Cationic or amphoteric protective colloids containing a relatively smaller content of amine monomer will tend to be less soluble and therefore at least a smaller proportion would tend to dissolve to form a solution with at least a larger proportion forming a colloidal dispersion.

The water may be added prior to the addition of acid or subsequently to the addition of acid or simultaneously with the addition of acid. When the water is added simultaneously it may be added separately to the acid or alternatively as an acid-water mixture. It may also be desirable to combine the resin with acid and water at temperatures higher than ambient (ie higher than 25° C. The elevated temperatures may often be at least 60° C. and may be as high as 100° C., for instance between 70 and 90° C., such as around 80° C. During the step of combining the resin with acid and water it may be desirable to apply agitation, for instance stirring the mixture of resin, acid and water in a vessel employing an impeller.

The acid may be a concentrated acid, for instance pure acid. By pure acid we mean that the acid has a purity of at least 98%, the remainder being ostensibly water. Usually the purity of pure acid would be at least 99%, for instance at least 99.5%, even at least 99.7%, at least 99.9% especially about 100%. Examples of pure acids include glacial acetic acid or pure formic acid.

It is also possible that the acid is in an acid-water mixture which may be regarded as a diluted acid. Typically the acid may have molarity of the least one molar and often at least two or three molar. Often the acid-water mixture may have concentration of acid of at least 10% by weight based on the total weight of the mixture. Typically, the acid may have a concentration of at least 30% or 40% and even at least 50% or more, for instance up to 60 or 70% or even higher such as up to 90% or more.

One desirable method for providing the cationic or amphoteric protective colloid is to add a mixture of water and acid to the resin which means that both water and acid are added at the same time and heat up this mixture to 80° C. under slight stirring.

It is normally preferred to employ sufficient water and acid to ensure that the resin is suitably protonated and that the so formed cationic or amphoteric protective colloid either dissolves to form a homogenous aqueous solution and/or forms a colloidal dispersion in the aqueous medium.

Suitably solid resin may be comminuted or pelletised to form small resin particles either before or during acidification in order to facilitate formation of the protective colloid.

A typical procedure for preparing the cationic or amphoteric protective colloid includes exothermic acidification of the resin in pure acetic acid (glacial acetic acid) or formic acid in order to obtain a 50 wt % solution and/or colloidal dispersion of the protective colloid in acid, followed by dispersing with water.

In an alternative and preferred procedure for preparing the cationic or amphoteric protective colloid, the resin may be dissolved in or form a colloidal dispersion in a mixture of formic acid and water or glacial acetic acid and water, respectively. The amount of acid used depends on the amine groups that are present in the resin. Typically for dissolution or colloidal dispersion formation with formic acid, the molar ratio of amine groups to acid can be adjusted between 1:8 and 1:0.8, preferably between 1:3 and 1:1. For dissolution or colloidal dispersion formation with formic acid, the molar ratio of amine groups to acid can be adjusted between 1:8 and 1:1, preferably between 1:3 and 1:1.1.

The finely divided, cationic or amphoteric, aqueous polymer dispersion according to the present invention is desirably prepared by emulsion polymerisation of a monomer blend in an aqueous medium containing the aforementioned cationic or amphoteric protective colloid. The monomer blend comprises at least one ethylenically unsaturated water insoluble monomer.

Preferably the monomer mixture comprises
(i) from 0 to 99.9% by weight of at least one ethylenically unsaturated aromatic monomer;
(ii) from 0.1 to 100% by weight of at least one ester of an ethylenically unsaturated carboxylic acid;
(iii) from 0 to 30% by weight of at least one vinyl ester of a linear or branched $C_1$- to $C_{18}$-carboxylic acids and
(iv) from 0 to 30% by weight of at least one non-ionic or anionic ethylenically unsaturated monomer differing from (i), (ii) and (iii),
the sum of (i)+(ii)+(iii)+(iv) being 100% by weight.

Preferably the ethylenically unsaturated aromatic monomer is an optionally substituted styrene.

For preferably the monomer mixture comprises:
(i) from 0 to 50% by weight, preferably from 0 to 29% by weight, of at least one optionally substitute styrene;
(ii) from 50 to 100% by weight of at least one $C_1$- to $C_{18}$-(meth)acrylate;
(iii) from 0 to 30% by weight of at least one vinyl ester of a linear or branched $C_1$- to $C_{18}$-carboxylic acids and
(iv) from 0 to 30% by weight of at least one non-ionic or anionic ethylenically unsaturated monomer differing from (i), (ii) and (iii),
the sum of (i)+(ii)+(iii)+(iv) being 100% by weight.

The monomers group (i) correspond to those of group (a) from the preparation of the aforementioned resin.

The monomers group (ii) include (meth)acrylates of C1- to C18-alcohols. Monomers (ii) are, for example, methyl acrylate, ethyl acrylate, n-propyl acrylate, isopropyl acrylate, n-butyl acrylate, sec-butyl acrylate, isobutyl acrylate, tert-butyl acrylate, ethyl hexyl acrylate, n-octyl acrylate, cyclohexyl acrylate, decyl acrylate, dodecyl acrylate, tetradecyl acrylate, methyl methacrylate, ethyl methacrylate, n-propyl methacrylate, isopropyl methacrylate, n-butyl methacrylate, sec-butyl methacrylate, isobutyl methacrylate, tert-butyl methacrylate, ethyl hexyl methacrylate, n-octyl methacrylate, cyclohexyl methacrylate, decyl methacrylate, dodecyl methacrylate, tetradecyl methacrylate. From this group of monomers, n-butyl acrylate and tert-butyl acrylate preferably used, in each case alone or in any desired mixtures. In such mixtures of n-butyl acrylate and tetrabutyl acrylate, the weight ratio is usually 3:1 to 1:3. However, ethyl hexyl acrylate and ethyl hexyl methacrylate are also suitable.

Monomers of group (iii) are vinyl esters of linear or branched $C_1$-$C_{30}$ carboxylic acids. Such carboxylic acids are saturated and straight chain, such as formic acid, acetic acid, propionic acid, butyric acid, valeric acid, caproic acid (hexanoic acid), heptanoic acid, caprylic acid (octanoic acid), pelargonic acid, capric acid (decanoic acid), undecanoic acid, lauric acid (dodecanoic acid), tridecanoic acid, myristic acid (tetradecanoic acid), pentadecanoic acid, palmitic acid, margaric acid, stearic acid, nonadecanoic acid, arachidic acid, behenic acid, lignoceric acid (tetracosanoic acid), cerotinic acid, melissic acid (triacontanoic acid). According to the invention, saturated, branched carboxylic acids, such as, for example, isobutyric acid, isovaleric acid (3-methylbutyric acid) and tubercolostearic acid, and strongly branched saturated carboxylic acid are also suitable. The latter are known by the term versatic acids, such as, for example, pivalic acid, neohexanoic acid. Suitable esters of linear or branched $C_1$-$C_{30}$ carboxylic acids are, For example, vinyl laurate, vinyl stearate, vinyl propionate, vinyl versatate, vinyl acetate, vinyl propylheptanoate, vinyl neo-decanoate (VeoVa® 9 from Hexion Speciality Chemicals) and vinyl pelargonate.

Examples of suitable monomers of group (iv) acrylamide, methacrylamide, N-methylolacrylamide, N-methylolmethacrylamide, N—$C_1$- to $C_{18}$-alkyl acrylamides, N—$C_1$- to $C_{18}$-alkyl methacrylamides, N-vinyl amides, N—$C_1$- to $C_{18}$-alkyl vinyl ethers, hydroxyalkyl esters and esters of mono ethylenically unsaturated mono- and dicarboxylic acids with N—$C_2$- to $C_4$-polyalkylene glycols.

The monomers group (iv) may also comprise so-called functional monomers i.e. monomers which, in addition to a polymerisable C═C double bond, also have a reactive functional group, for example an oxirane group, a reactive carbonyl group, e.g. and acetoacetyl group, and isocyanate group, an N-hydroxy methyl group, an N-alkoxy methyl group, a tri-alkyl silyl, a trialkoxy silyl group or another group reactive towards nucleophiles.

A monomer mixture comprising
(i) from 0 to 50% by weight, preferably from 0 to 29% by weight, of styrene;
(ii) from 50 to 100% by weight, preferably from 71 to 100% by weight, n-butyl acrylate, tert-butyl acrylate or mixtures of n-butyl acrylate and tert-butyl acrylate in the weight ratio of 3:1 to 1:3
is preferred.

The polymerisation of the monomers (i), (ii), if appropriate (iii) and, if appropriate, (iv) is effected by an emulsion polymerisation method, i.e. the monomer is to be polymerised are present in the polymerisation mixture as an aqueous emulsion. The cationic or amphoteric protective colloids described above are used for stabilising the monomer emulsions.

The emulsion polymerisation is effected in general in a temperature range of from 40 to 150° C., preferably from 60 to 90° C. The emulsion polymerisation is conducted in the presence of second polymerisation initiators, which are preferably water-soluble. Initiators for the emulsion polymerisation may be used in any conventional amount. In general, from 0.2 to 5%, preferably from 0.4 to 3.5%, more preferably 0.5 to 2.5% by weight of at least one initiator, based on the monomer is to be polymerised are used. Suitable second polymerisation initiators for use in the emulsion polymerisation are, for example, azo compounds, peroxides, hydroperoxides, inorganic peroxides and redox systems, such as combinations of hydrogen peroxide and ascorbic acid or tert-butyl hydroperoxide and ascorbic acid. The redox systems can moreover comprise heavy-metal cations, such as cerium, manganese or iron(II) ions, for activation.

In the emulsion polymerisation, the monomers can either be metered directly into the initially taken mixture or they can be fed in the form of an aqueous emulsion or mini emulsion to the polymerisation batch. In order to emulsify the monomers in water, for example, a part of the aqueous solution and/or colloidal dispersion of the cationic or amphoteric protective colloid described above, optionally diluted with water can be used as an emulsifier, or the monomers maybe emulsifier with the aid of customary non-ionic, anionic, cationic or amphoteric emulsifier is in water.

Customary emulsifiers are used only if appropriate. The amounts used are, for example, from 0.05 to 3% by weight and preferably in the range from 0.5 to 2% by weight. Customary emulsifiers are described in detail in the literature, cf. for example M. Ash, I. Ash, Handbook of Industrial Surfactants, Third Edition, Synapse Information Resources Inc. Examples of customary emulsifiers include the reaction products of long chain monohydric alcohols ($C_{10}$- to $C_{22}$-alkanols) with from 4 to 50 mol of ethylene oxide and/or propylene oxide per mole of alcohol or ethoxylated phenols or alkoxylated alcohols esterified with sulphuric acid, which are generally used in the form neutralised with alkalis. Further customary emulsifiers are, for example, sodium alkane sulphonates, sodium alkyl sulphates, sodium dodecylbenzene sulphonates, sulphosuccinate esters, quaternary alkyl ammonium salts, alkyl benzyl ammonium salts, such as dimethyl-$C_{12}$ to $C_{18}$-alkyl benzyl ammonium chlorides, primary, secondary and tertiary fatty amine salts, quaternary amido amine compounds, alkylpyridinium salts, alkyl imidazolinium salts and alkyl oxazolinium salts. Preferably, however, no emulsifiers are used.

The metering of the monomers for carrying out emulsion polymerisation can be effected continuously or batchwise. With the use of a monomer mixture, the metering of the monomers can be effected as a mixture or separately or in a manner of a step or gradient procedure. The addition can be effected uniformly or non-uniformly, i.e. with a changing metering rate, over the metering period. By adding a portion of the monomer to the initially taken mixture comprising aqueous solution and/or aqueous colloidal dispersion of cationic or amphoteric protective colloid, metering by means of swelling procedure is possible.

In a preferred embodiment of the present invention, the first polymerisation for the preparation of the resin and/or the emulsion polymerisation is/are carried out in the presence of polymerisation regulators. Suitable regulators are, for example, mercaptans, such as ethyl mercaptan, n-butyl mercaptan, tert-butyl mercaptan, n-dodecyl mercaptan or tetradodecyl mercaptan, thioglycolic acid, 2-mercaptoethanol and 2-ethylhexyl thioglycolate, carbon tetrabromide, or isopropanol. Furthermore, suitable regulators are from the class consisting of the terpenes, preferably from the class consisting of the monocyclic terpenes and particularly preferably from a group consisting of the menthadienes. Among said regulators of the group consisting of menthadienes, terpinolene is very particularly preferred. If polymerisation regulators are used, the amounts of regulator are, For example, from 0.1 to 10% by weight, preferably for 0.3 to 5% by weight.

The pH of the reaction mixture is, for example, in the range from 1 to 5, in general from 2 to 4, in the polymerisation stage.

The emulsion polymerisation may be carried out at a temperature higher than ambient (i.e. higher than 25° C.). Typically the polymerisation may be carried out at temperatures between 75 and 95° C., particularly between 80 and 90° C.

In order to remove the remaining monomers as substantially as possible from the polymer dispersion, a post polymerisation is expediently carried out after the end of the emulsion polymerisation. For this purpose, for example, an initiator from the group consisting of hydroperoxide, peroxides, such as hydrogen peroxide, and/or azo initiators is added to the polymer dispersion after the end of the main polymerisation. Combining of the initiators with suitable reducing agents, such as, for example, ascorbic acid or sodium bisulphite, is also possible. Oil soluble, sparingly water-soluble initiators are preferably used, for example customary organic peroxides, such as dibenzoyl peroxide, di-tert-butyl peroxide, tert-butyl hydroperoxide, cumyl hydroperoxide or biscyclo-hexyl peroxybicarbonate. For the post polymerisation, the reaction mixture is heated, for example, to a temperature which corresponds the temperature at which the main polymerisation was carried out or which is up to 20° C., preferably up to 10° C., lower. The main polymerisation is complete when the polymerisation initiator has been consumed or the monomer conversion is, for example, at least 98%, preferably at least 99.5%. For the post polymerisation, tert-butyl hydroperoxide is preferably used. The polymerisation is carried out, for example, in a temperature range of from 40 to 110° C., in general from 50 to 105° C.

At the final stage of the post-polymerization, the pH of the dispersion can be adjusted with formic acid or glacial acetic acid to be between 2 and 4, for instance between 2 or 2.5 and about 3.

In the emulsion polymerisation, finely divided, aqueous polymer dispersions which have cationic or amphoteric properties owing to the composition of the cationic or amphoteric protective colloid are obtained. The mean particle size of the dispersed particles is, for example 5 to 250 nm, preferably less than 100 nm, particularly preferably from 10 to 80 nm. The mean particle size can be determined by methods known to the person skilled in the art, such as, for example, laser correlation spectroscopy, ultracentrifuging or CHDF. A further measure of the particle size of the dispersed polymer particles is the LT value. For determining the LT value (light transmittance), the polymer dispersion to be investigated in each case is measured in 0.1% strength by weight aqueous formulation in a cell having an edge length of 2.5 cm with light of wavelength 600 nm. The mean particle size can be calculated from the measured values of cf. B. Verner, M. Bárta, B. Sedlácek, Tables of Scattering Functions For Spherical Particles, Prague 1976, Edice Marco, Rada D-DATA, SVAZEK D-1.

The polymer concentration of the aqueous dispersions obtained in the emulsion polymerisation is, for example, from 15 to 40, preferably from 20 to 30% by weight.

The invention also relates to a process for the preparation of the finely divided, cationic or amphoteric, aqueous polymer dispersions which are described above and are obtainable by emulsion polymerisation of ethylenically unsaturated monomers in the presence of a cationic or amphoteric protective colloid, first the cationic or amphoteric protective colloid is prepared in the presence of at least one first polymerisation initiator in an organic solvent and is carried out in a pressurised reactor at a pressure of at least 1720 kPa and at a temperature of at least 150° C., which monomer blend comprises at least one ethylenically unsaturated monomer carrying an amine group, to provide a resin, then combining the resin with an acid and water, to form the cationic or amphoteric protective colloid, thereafter carrying out an emulsion polymerisation by introducing a monomer mixture into an aqueous medium containing said cationic or amphoteric protective colloid and at least one second polymerisation initiator, wherein said monomer mixture comprises at least one ethylenically unsaturated water insoluble monomer.

As mentioned above, in a preferred embodiment of the present invention, the first polymerisation for the preparation of the resin and/or the emulsion polymerisation may be carried out in the presence of polymerisation regulators.

The finely divided, cationic or amphoteric aqueous polymer dispersions described above are used as sizing agents for paper, board and cardboard. They can be used for the production of all paper varieties, for example of writing and printing papers and packaging paper is and papers for the packaging of liquids. They are suitable particular for the surface sizing of paper products. The dispersions according to the invention can be processed by all methods suitable in surface sizing, but they can also be used for internal sizing. For use as a sizing agent, the aqueous polymer dispersions are diluted by adding water, generally to a polymer content, for example, from 0.05 to 5% by weight. The amount of polymer dispersion depends on the desired degree of sizing of the papers or paper products to be finished. Such preparation solutions can, if appropriate, comprise further substances, for example starch, dyes, optical brighteners, biocides, paper strength agents, fixing agents, antifoams, retention aids and/or drainage aids.

The size dispersion can be applied to paper, board or cardboard by means of a size press or other application units, such as film press, speed size or gate roll. The amount of polymer which is applied to the surface of the paper products is, for example, from 0.005 to 1.0 $g/m^2$, preferably from 0.01 to 0.5 $g/m^2$.

Even in a very low dose, the polymer dispersions according to the invention exhibit an excellent sizing effect on all papers produced with different fibre types from unbleached softwood, unbleached deciduous wood, unbleached hardwood, bleached softwood, bleached deciduous wood, bleached hardwood, deinked fibres or mixtures of different fibre types. Furthermore, the dispersions according to the invention exhibit very good compatibility with the customary starches, for example potato starch, cornstarch, wheat starch, tapioca starch. Moreover, the dispersions according to the invention exhibit complete development of sizing immediately after the production and drying of the paper web.

The invention is illustrated in more detail by reference to the following, non-limiting examples.

EXAMPLES

Methods of Characterization

Molar mass was determined via gel permeation chromatography (GPC) at 22° C. The mobile phase used was a mixture of 1% of triethanolamine in THF, as well as three highly crosslinked polystyrene-polydivinylbenzene columns (2× PLgel 10 µm as bed 300×7.5 mm and also 1× Plgel 10 µm). An RI detector system (Waters 2414) is used. Polystyrene standards were used to determine molar mass.

To verify the copolymer composition, the distillate isolated by the vaporization step was subjected to gas chromatography measurements.

Tg Determination:

Light transmittance (LT) was obtained by transmission measurements on dispersions using a Hach DR 2010 spectrophotometer at a wavelength of 600 nm, a polymer concentration of 0.1% by weight and a path length of 25 mm.

Examples for the Synthesis of Resin (SGO)

Example 1

Synthesis of SGO 1

A reaction mixture of 66.2% of styrene, 23.3% of N,N-dimethylaminoethyl acrylate, 10% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 219-221° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=3400 g/mol
$M_w$=9000 g/mol
PD=2.7
$T_g$=32° C.

Example 2

Synthesis of SGO 2

A reaction mixture of 66.2% of styrene, 23.3% of N,N-dimethylaminoethyl acrylate, 10% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 199-201° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=4100 g/mol
$M_w$=13 000 g/mol
PD=3.2
$T_g$=36° C.

Example 3

Synthesis of SGO 3

A reaction mixture of 54.9% of styrene, 29.6% of N,N-dimethylaminoethyl acrylate, 15% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 189-191° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=3900 g/mol
$M_w$=12 000 g/mol
PD=3.1
$T_g$=30° C.

Example 4

Synthesis of SGO 4

A reaction mixture of 42.2% of styrene, 42.3% of N,N-dimethylaminoethyl acrylate, 15% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 189-191° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=3100 g/mol
$M_w$=10 100 g/mol
PD=3.3
$T_g$=31° C.

Example 5

Synthesis of SGO 5

A reaction mixture of 55.6% of styrene, 19.1% of N,N-dimethylaminoethyl acrylate, 3.2% of N,N-dimethylaminopropylmethacrylamide, 11.6% of acrylic acid, 20% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 184-186° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=4600 g/mol
$M_w$=84 000 g/mol PD=18.3
$T_g$=62° C.

Example 6

Synthesis of SGO 6

A reaction mixture of 50.7% of styrene, 25.4% of N,N-dimethylaminoethyl acrylate, 8.4% of N,N-dimethylaminopropylmethacrylamide, 15% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 219-221° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=1900 g/mol
$M_w$=6700 g/mol
PD=3.5
$T_g$=18° C.

Example 7

Synthesis of SGO 7

A reaction mixture of 64.4% of styrene, 23.3% of N,N-dimethylaminoethyl acrylate, 1.8% of stearyl acrylate, 10% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 219-221° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=2600 g/mol
$M_w$=8900 g/mol
PD=3.4
$T_g$=27° C.

Example 8

Synthesis of SGO 8

A reaction mixture of 53.2% of styrene, 29.6% of N,N-dimethylaminoethyl acrylate, 1.7% of stearyl acrylate, 15% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 219-221° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=2100 g/mol
$M_w$=6400 g/mol
PD=3.0
$T_g$=21° C.

Example 9

Synthesis of SGO 9

A reaction mixture of 71.6% of styrene, 17.9% of N,N-dimethylaminoethyl acrylate, 10% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 199-201° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=5300 g/mol
$M_w$=37 600 g/mol
PD=7.09
$T_g$=49° C.

Example 10

Synthesis of SGO 10

A reaction mixture of 68% of styrene, 21.5% of N,N-dimethylaminoethyl acrylate, 10% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 219-221° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=2800 g/mol
$M_w$=9900 g/mol
PD=3.5
$T_g$=36° C.

Example 11

Synthesis of SGO 11

A reaction mixture of 54.9% of styrene, 29.6% of N,N-dimethylaminoethyl methacrylate, 15% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 189-191° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=6300 g/mol
$M_w$=59 700 g/mol
PD=9.5
$T_g$=34° C.

Example 12

Synthesis of SGO 12

A reaction mixture of 59.2% of styrene, 25.3% of N,N-dimethylaminoethyl acrylate, 15% of isooctanol and 0.5% of di-tert-butyl peroxide was continuously charged into a reactor (described in U.S. Pat. No. 6,605,681) at constant temperature.

In the regulated process, the amount of starting material in the reaction zone and the feed rate were policed so as to ensure a residence time of 12 minutes in the continuous stirred tank. The process was conducted for 10-30 residence times. The reaction temperature of the continuous stirred tank was kept constant in the range of 189-191° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=5900 g/mol
$M_w$=68 000 g/mol
PD=11.5
$T_g$=36° C.

Example 13

Synthesis of SGO 13

A reaction mixture of 64.2% of styrene, 20.3% of N,N-dimethylaminoethyl acrylate, 15% of isooctanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 189-191° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=6800 g/mol
$M_w$=92 200 g/mol
PD=13.6
$T_g$=58° C.

Example 14

Synthesis of SGO 14

A reaction mixture of 67.6% of styrene, 16.9% of N,N-dimethylaminoethyl acrylate, 15% of 1-hexanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 189-191° C. and at a pressure of about 2066 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=6800 g/mol
$M_w$=78 900 g/mol
PD=11.6
$T_g$=46° C.

Example 15

Synthesis of SGO 15

A reaction mixture of 65.3% of styrene, 23.3% of N,N-dimethylaminoethyl acrylate, 0.9% of acrylic acid, 10% of 2-ethylhexanol and 0.5% of di-tert-butyl peroxide was continuously charged into a reactor (described in U.S. Pat. No. 6,605,681) at constant temperature.

In the process, the amount of starting material in the reaction zone and the feed rate were regulated so as to ensure a residence time of 12 minutes in the continuous stirred tank. The process was conducted for 10-30 residence times. The reaction temperature of the continuous stirred tank was kept constant in the range of 200-203° C. and at a pressure of about 1720 kPa. The reaction product was continuously pumped through a devolatilization zone and then continuously collected and subsequently analyzed in respect of molar mass ($M_n$, $M_w$), composition and also glass transition temperature. The copolymer has the following properties:
$M_n$=3 800 g/mol
$M_w$=24 900 g/mol
PD=6.6
$T_g$=53° C.

Examples of the Synthesis of Finely Divided, Cationic or Amphoteric, Aqueous Polymer Dispersions

Example 16

Synthesis of Polymer Dispersion 1

In a ground-joint 2 l flask equipped with stirrer and internal temperature measurement, 50 g of SGO 1 was acidified in a mixture of 20.00 g of formic acid and 245 g of water at 80° C. to form an aqueous cationic protective colloid. While stirring, 0.30 g of a 10% by weight iron(II) sulfate heptahydrate solution in water and also 2.00 g of a 10% by weight ascorbic acid solution were added to the aqueous cationic protective colloid.

This was followed by the metered addition at 80° C. of 4 g of a 5% by weight hydrogen peroxide solution during 30 min. Thereafter, a mixture of 10 g of styrene and 40 g of tert-butyl acrylate was metered in at 80° C. during 120 min. Concurrently, in a separate feed, 16 g of a 5% by weight hydrogen peroxide solution were added during 150 min. On completion of the initiator addition the batch was postpolymerized for 30 min and cooled down to 70° C. Subsequently, 2 g of a 10% by weight ascorbic acid solution were added and stirred in for 20 min. This was followed by the renewed addition of 2 g of a 10% by weight ascorbic acid solution. Thereafter, the reaction mixture was stirred for 20 min. Finally, 1 g of a commercially available defoamer (AfranilR T™ from BASF SE) and also 10 g of completely ion-free water were added, followed by cooling down to room temperature.

A finely divided polymer dispersion having a solids content of 24.7% by weight and an LT value (0.1%) of 90.2% was obtained.

Example 17

Synthesis of Dispersion 2

In a ground-joint 2 l flask equipped with stirrer and internal temperature measurement, 50 g of SGO 2 protective colloid GK 2690-25-41 were was acidified in a mixture of 40.00 g of glacial acetic acid and 225 g of water at 80° C. to form an aqueous cationic protective colloid. While stirring, 0.30 g of a 10% by weight iron(II) sulfate heptahydrate solution in water and also 2.00 g of a 10% by weight ascorbic acid solution were added to the aqueous cationic protective colloid. This was followed by the metered addition at 80° C. of 4 g of a 5% by weight hydrogen peroxide solution during 30 min. Thereafter, a mixture of 10 g of styrene, 38 g of tert-butyl acrylate, 2 g of acrylic acid and 0.30 g of terpinolene was metered in during 120 min. Concurrently, in a separate feed, 16 g of a 5% by weight hydrogen peroxide solution were continuously added during 150 min. On completion of the initiator addition the batch was postpolymerized for 30 min and cooled down to 70° C. Subsequently, 2 g of a 10% by weight ascorbic acid solution and 1 g of a 10% by weight tertiary butyl hydroperoxide solution were added and stirred in for 20 min. This was followed by the renewed addition of 2 g of a 10% by weight ascorbic acid solution and 1 g of a 10% by weight tertiary butyl hydroperoxide solution. Thereafter, the reaction mixture was stirred for 20 min. Finally, 1 g of a commercially available defoamer (Afranil T™ from BASF SE) and also 10 g of completely ion-free water were added, followed by cooling down to room temperature.

A finely divided polymer dispersion having a solids content of 24.6% by weight and an LT value (0.1%) of 79.3% was obtained.

Example 18

Synthesis of Dispersion 3

In a ground-joint 2 l flask equipped with stirrer and internal temperature measurement, 45 g of SGO 3 was acidified in a mixture of 16.5 g of glacial acetic acid and 185 g of water at 80° C. to form an aqueous cationic protective colloid. While stirring, 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 3 g of a 5% by weight hydrogen peroxide solution during 30 min. Thereafter, a mixture of 6 g of styrene, 22.5 g of tert-butyl acrylate, 1.5 g of acrylic acid and 0.2 g of terpinolene was metered in during 120 min. Concurrently, in a separate feed, 12 g of a 5% by weight hydrogen peroxide solution were continuously added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 1.75 g of a commercially available defoamer (Afranil T from BASF SE) and also 7.5 g of completely ion-free water were added, followed by cooling down to room temperature.

A finely divided polymer dispersion having a solids content of 24.5% by weight and an LT value (0.1%) of 95.5% was obtained.

Example 19

Synthesis of Dispersion 4

In a ground-joint 2 l flask equipped with stirrer and internal temperature measurement, 37.5 g of SGO 3 was acidified in a mixture of 19.7 g of formic acid and 182 g of water at 80° C. to form an aqueous cationic protective colloid. While stirring, 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 3 g of a 5% by weight hydrogen peroxide solution during 30 min. Thereafter, a mixture of 7.5 g of styrene, 28.5 g of tert-butyl acrylate, 1.5 g of acrylic acid and 0.2 g of terpinolene was metered in during 120 min. Concurrently, in a separate feed, 12 g of a 5% by weight hydrogen peroxide solution were continuously added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 0.75 g of a commercially available defoamer (Afranil T from BASF SE) and also 7.5 g of completely ion-free water were added, followed by cooling down to room temperature.

A finely divided polymer dispersion having a solids content of 23.7% by weight and an LT value (0.1%) of 78.4% was obtained.

Example 20

Synthesis of Dispersion 5

In a ground-joint 2 l flask equipped with stirrer and internal temperature measurement, 37.5 g of SGO 4 was acidified in a mixture of 19.7 g of glacial acetic acid and 182 g of water at 80° C. to form an aqueous cationic protective colloid. While stirring, 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 3 g of a 5% by weight hydrogen peroxide solution during 30 min. Thereafter, a mixture of 7.5 g of styrene, 28.5 g of tert-butyl acrylate and 1.5 g of acrylic acid was metered in during 120 min. Concurrently, in a separate feed, 12 g of a 5% by weight hydrogen peroxide solution were added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 0.75 g of a commercially available defoamer (Afranil T™ from BASF SE) and also 7.5 g of completely ion-free water were added, followed by cooling down to room temperature. A finely divided polymer dispersion having a solids content of 23.6% by weight and an LT value (0.1%) of 54.2% was obtained.

Example 21

Synthesis of Dispersion 6

In a ground-joint 2 l flask equipped with stirrer and internal temperature measurement, 33.8 g of SGO 5 was acidified in a mixture of 9.7 g of formic acid and 191 g of water at 80° C. to form an aqueous amphoteric protective colloid. While stirring, 0.23 g of a 10% by weight iron(II) sulfate heptahydrate solution in water and also 1.50 g of a 10% by weight ascorbic acid solution were added to the aqueous amphoteric protective colloid. This was followed by the metered addition at 80° C. of 3 g of a 5% by weight hydrogen peroxide solution during 30 min. Thereafter, a mixture of 8.3 g of styrene, 31.5 g of tert-butyl acrylate, 1.5 g of acrylic acid and 0.20 g of terpinolene was metered in during 120 min. Concurrently, in a separate feed, 12 g of a 5% by weight hydrogen peroxide solution were added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 0.7 g of a commercially available defoamer (Afranil T™ from BASF SE) and also 7.5 g of completely ion-free water were added, followed by cooling down to room temperature.

A finely divided polymer dispersion having a solids content of 23.2% by weight and an LT value (0.1%) of 94.9% was obtained.

Example 22

Synthesis of Dispersion 7

In a ground-joint 2 l flask equipped with stirrer and internal temperature measurement, 33.8 g of SGO 5 was acidified in a mixture of 4.3 g of formic acid and 197 g of water at 80° C. to form an aqueous amphoteric protective colloid. While stirring, 0.23 g of a 10% by weight iron(II) sulfate heptahydrate solution in water and also 1.50 g of a 10% by weight ascorbic acid solution were added to the aqueous amphoteric protective colloid.

This was followed by the metered addition at 80° C. of 3 g of a 5% by weight hydrogen peroxide solution during 30 min. Thereafter, a mixture of 8.3 g of styrene and 33 g of tert-butyl acrylate was metered in during 120 min. Concurrently, in a separate feed, 12 g of a 5% by weight hydrogen peroxide solution were added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 0.75 g of a commercially available defoamer (AfranilR T™ from BASF SE) and also 7.5 g of completely ion-free water were added, followed by cooling down to room temperature.

A finely divided polymer dispersion having a solids content of 24.6% by weight and an LT value (0.1%) of 97.2% was obtained.

Example 23

Synthesis of Dispersion 8

In a ground-joint 2 l flask equipped with stirrer and internal temperature measurement, 33.8 g of SGO 7 was acidified in a mixture of 9.2 g of glacial acetic acid and 191 g of water at 80° C. to form an aqueous cationic protective colloid. While stirring, 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 3 g of a 5% by weight hydrogen peroxide solution during 30 min. Thereafter, a mixture of 8.3 g of styrene, 33 g of tert-butyl acrylate and 0.2 g of terpinolene was metered in during 120 min. Concurrently, in a separate feed, 12 g of a 5% by weight hydrogen peroxide solution were added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 0.75 g of a commercially available defoamer (Afranil T™ from BASF SE) and also 7.5 g of completely ion-free water were added, followed by cooling down to room temperature.

A finely divided polymer dispersion having a solids content of 23.4% by weight and an LT value (0.1%) of 92.7% was obtained.

Example 24

Synthesis of Dispersion 9

In a ground-joint 2 l flask equipped with stirrer and internal temperature measurement, 33.8 g of SGO 8 was acidified in a mixture of 17.8 g of formic acid and 183 g of water at 80° C. to form an aqueous cationic protective colloid. While stirring, 0.23 g of a 10% by weight iron(II) sulfate heptahydrate solution in water and also 1.5 g of a 10% by weight ascorbic acid solution were added to the aqueous cationic protective colloid. This was followed by the metered addition at 80° C. of 3 g of a 5% by weight hydrogen peroxide solution during 30 min. Thereafter, a mixture of 8.3 g of styrene and 33 g of tert-butyl acrylate was metered in during 120 min. Concurrently, in a separate feed, 12 g of a 5% by weight hydrogen peroxide solution were added during 150 min. On completion of the initiator addition the batch was postpolymerized for 30 min and cooled down to 70° C. Subsequently, 1.5 g of a 10% by weight ascorbic acid solution and 0.75 g of a 10% by weight tert-butyl hydroperoxide solution were added and stirred in for 20 min. This was followed by the renewed addition of 1.5 g of a 10% by weight ascorbic acid solution and 0.75 g of a 10% by weight tert-butyl hydroperoxide solution. Thereafter, the reaction mixture was stirred for 20 min. Finally, 0.75 g of a commercially available defoamer (Afranil T™ from BASF SE) and also 7.5 g of completely ion-free water were added, followed by cooling down to room temperature.

A finely divided polymer dispersion having a solids content of 22.4% by weight and an LT value (0.1%) of 90.7% was obtained.

Example 25

Synthesis of Dispersion 10

In a ground-joint 2 l flask equipped with stirrer and internal temperature measurement, 45 g of SGO 9 was acidified exothermically in 37.8 g of glacial acetic acid at 85° C. to form an aqueous cationic protective colloid. Then, 240 g of completely ion-free water were added dropwise to the aqueous cationic protective colloid over 30 min with stirring at a temperature of 85° C., and in the process a temperature of about 80° C. is reached. At that temperature, 0.23 g of a 10% by weight iron(II) sulfate heptahydrate solution in water and also 1.50 g of a 10% by weight ascorbic acid solution were added. This was followed by the metered addition at 80° C. of 3 g of a 5% by weight hydrogen peroxide solution during 30 min. This was followed by the metered addition of a mixture of 30 g of tert-butyl acrylate and also 0.2 g of terpinolene during 120 min. Concurrently, in a separate feed, 12 g of a 5% by weight hydrogen peroxide solution were added during 150 min. On completion of the initiator addition the batch was postpolymerized for 30 min and cooled down to 70° C. Subsequently, 1.5 g of a 10% by weight ascorbic acid solution and also 1.5 g of a 10% by weight tert-butyl hydroperoxide solution were added and stirred in for 20 min. This was followed by the renewed addition of 1.5 g of a 10% by weight ascorbic acid solution and also 1.5 g of a 10% by weight tert-butyl hydroperoxide solution. Thereafter, the reaction mixture was stirred for 20 min. Finally, 0.75 g of a commercially available defoamer (Afranil T™ from BASF SE) and also 7.5 g of completely ion-free water were added, followed by cooling down to room temperature.

A finely divided polymer dispersion having a solids content of 17.8% by weight and an LT value (0.1%) of 90.9% was obtained.

Example 26

Synthesis of Dispersion 11

In a ground-joint 2 l flask equipped with stirrer and internal temperature measurement, 45 g of SGO 10 was acidified in a mixture of 3.6 g of formic acid and 197 g of water at 80° C. to form an aqueous cationic protective colloid. While stirring, 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 3 g of a 5% by weight hydrogen peroxide solution during 30 min. Thereafter, a mixture of 6 g of styrene, 24 g of tert-butyl acrylate and also 0.2 g of terpinolene was metered in during 120 min. Concurrently, in a separate feed, 12 g of a 5% by weight hydrogen peroxide solution were continuously added during 150 min. On completion of the initiator addition the batch was postpolymerized for 30 min and cooled down to 70° C. Subsequently, 1.5 g of a 10% by weight ascorbic acid solution and also 0.75 g of a 10% by weight tert-butyl hydroperoxide solution were added and stirred in for 20 min. This was followed by the renewed addition of 1.5 g of a 10% by weight ascorbic acid solution and also 0.75 g of a 10% by weight tert-butyl hydroperoxide solution. Thereafter, the reaction mixture was stirred for 20 min. Finally, 0.75 g of a commercially available defoamer (Afranil T™ from BASF SE) and also 7.5 g of completely ion-free water were added, followed by cooling down to room temperature.

A finely divided polymer dispersion having a solids content of 24.3% by weight and an LT value (0.1%) of 97.6% was obtained.

Example 27

Synthesis of Dispersion 12

In a ground-joint 2 l flask equipped with stirrer and internal temperature measurement, 37.5 g of SGO 11 was acidified in a mixture of 4.3 g of formic acid and 258 g of water at 80° C. to form an aqueous cationic protective colloid. While stirring, 0.23 g of a 10% by weight iron(II) sulfate heptahydrate solution in water and 1.50 g of a 10% by weight ascorbic acid solution were added to the aqueous cationic protective colloid. This was followed by the metered addition at 80° C. of 15 g of a 5% by weight hydrogen peroxide solution during 180 min. Concurrently, a mixture of 7.5 g of styrene and 30 g of tert-butyl acrylate were added during 150 min by metered addition. On completion of the initiator feed the batch was postpolymerized for 30 min and cooled down to 70° C. Subsequently, 1.5 g of a 10% by weight ascorbic acid solution were added and stirred in for 20 min. This was followed by a renewed addition of 1.5 g of a 10% by weight ascorbic acid solution and also further stirring for 20 min. Finally, 0.75 g of a commercially available defoamer (Afranil T™ from BASF SE), 7.5 g of completely ion-free water and also 15.4 g of formic acid were added and the batch was cooled down to room temperature. A finely divided polymer dispersion having a solids content of 19.4% by weight and an LT value (0.1%) of 96.2% was obtained.

Example 28

Synthesis of Dispersion 13

In a ground-joint 2 l flask equipped with stirrer and internal temperature measurement, 45 g of SGO 12 was dissolved in a mixture of 4.5 g of formic acid and 196 g of water at 80° C. to form an aqueous cationic protective colloid. While stirring, 0.23 g of a 10% by weight iron(II) sulfate heptahydrate solution in water and 1.50 g of a 10% by weight ascorbic acid solution were added to the aqueous cationic protective colloid. This was followed by the metered addition at 80° C. of 3 g of 5% by weight hydrogen peroxide solution during 30 min. Subsequently, a mixture of 6 g of styrene, 24 g of tert-butyl acrylate and also 0.23 g of terpinolene were added during 120 min by metered addition. Concurrently, in a separate feed, 12 g of a 5% by weight hydrogen peroxide solution were added during 150 min. On completion of the initiator feed the batch was postpolymerized for 30 min and cooled down to 70° C. Subsequently, 1.5 g of a 10% by weight ascorbic acid solution and also 0.75 g of a 10% by weight tert-butyl hydroperoxide solution were added and stirred in for 20 min. This was followed by a renewed addition of 1.5 g of a 10% by weight ascorbic acid solution and 1.5 g of a 10% by weight tert-butyl hydroperoxide solution. Thereafter, the reaction mixture was further stirred for 20 min. Finally, 1.5 g of a commercially available defoamer (Afranil T™ from BASF SE) and also 7.5 g of completely ion-free water were added and the batch was cooled down to room temperature.

A finely divided polymer dispersion having a solids content of 22.7% by weight and an LT value (0.1%) of 94.4% was obtained.

Example 29

Synthesis of Dispersion 14

In a ground-joint 2 l flask equipped with stirrer and internal temperature measurement, 45 g of SGO 9 was acidified in a mixture of 3.0 g of formic acid and 257 g of water at 80° C. to form an aqueous cationic protective colloid. While stirring, 0.23 g of a 10% by weight iron(II) sulfate heptahydrate solution in water and 1.50 g of a 10% by weight ascorbic acid solution were added to the aqueous cationic protective colloid. This was followed by the metered addition at 80° C. of 3 g of 5% by weight hydrogen peroxide solution during 30 min. This was followed by the metered addition of a mixture of 6 g of styrene, 24 g of tert-butyl acrylate and also 0.2 g of terpinolene during 120 min. Concurrently, in a separate feed, 12 g of a 5% by weight hydrogen peroxide solution were added during 150 min. On completion of the initiator feed the batch was postpolymerized for 30 min and cooled down to 70° C. Subsequently, 1.5 g of a 10% by weight ascorbic acid solution and also 1.5 g of a 10% by weight tert-butyl hydroperoxide solution were added and stirred in for 20 min. This was followed by a renewed addition of 1.5 g of a 10% by weight ascorbic acid solution and 1.5 g of a 10% by weight tert-butyl hydroperoxide solution. Thereafter, the reaction mixture was further stirred for 20 min. Finally, 0.75 g of a commercially available defoamer (Afranil T™ from BASF SE), 7.5 g of completely ion-free water and also 10.5 g of formic acid were added and the batch was cooled down to room temperature.

A finely divided polymer dispersion having a solids content of 18.8% by weight and an LT value (0.1%) of 96.3% was obtained.

Example 30

Synthesis of Dispersion 15

In a ground-joint 2 l flask equipped with stirrer and internal temperature measurement, 45 g of SGO 13 was acidified in a mixture of 3.67 g of formic acid and 197 g of water at 80° C. to form an aqueous cationic protective colloid. While stirring, 0.23 g of a 10% by weight iron(II) sulfate heptahydrate solution in water and 1.50 g of a 10% by weight ascorbic acid solution were added to the aqueous cationic protective colloid. This was followed by the metered addition at 80° C. of 12 g of 5% by weight hydrogen peroxide solution during 150 min. Concurrently, a mixture of 6.0 g of styrene, 24 g of tert-butyl acrylate and also 0.2 g of terpinolene were added during 120 min by metered addition. On completion of the initiator feed the batch was postpolymerized for 30 min and cooled down to 70° C. Subsequently, 1.5 g of a 10% by weight ascorbic acid solution and also 0.75 g of a 10% by weight tert-butyl hydroperoxide solution were added and stirred in for 20 min. This was followed by a renewed addition of 1.5 g of a 10% by weight ascorbic acid solution and also 0.75 g of a 10% by weight tert-butyl hydroperoxide solution. Thereafter, the reaction mixture was further stirred for 20 min. Finally, 0.75 g of a commercially available defoamer (Afranil T™ from BASF SE) and 7.5 g of completely ion-free water were added and the batch was cooled down to room temperature.

A finely divided polymer dispersion having a solids content of 25.2% by weight and an LT value (0.1%) of 97.1% was obtained.

Example 31

Synthesis of Dispersion 16

In a ground-joint 2 l flask equipped with stirrer and internal temperature measurement, 45 g of SGO14 acidified in a mixture of 3 g formic acid and 250 g of water at 80° C. to form an aqueous cationic protective colloid. While stirring 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 30 g of a 5% by weight hydrogen peroxide solution during 180 min. Concurrently, a mixture of 6.0 g of styrene and also 24 g of tert-butyl acrylate was added during 150 min by metered addition. On completion of the initiator feed the batch was postpolymerized for 30 min and cooled down to 70° C. Subsequently, 1.5 g of a 10% by weight ascorbic acid solution were added and stirred in for 20 min. This was followed by a renewed addition of 1.5 g of a 10% by weight ascorbic acid solution and also subsequent stirring for 20 min. Finally, 0.75 g of a commercially available defoamer (Afranil T™ from BASF SE), 7.5 g of completely ion-free water and also 10.5 g of formic acid were added and the batch was cooled down to room temperature.

A finely divided polymer dispersion having a solids content of 19.4% by weight and an LT value (0.1%) of 95.0% was obtained.

Example 32

Synthesis of Dispersion 17

In a ground-joint 2 l flask equipped with stirrer and internal temperature measurement, 45 g of SGO14 was acidified in a mixture of 3 g formic acid and 264 g of water at 80° C. to form an aqueous cationic protective colloid. While stirring, 0.23 g of a 10% by weight iron(II) sulfate heptahydrate solution in water and also 1.50 g of a 10% by weight ascorbic acid solution were added to the aqueous cationic protective colloid. This was followed by the metered addition at 80° C. of 15 g of a 5% by weight hydrogen peroxide solution during 180 min. Concurrently, a mixture of 6.0 g of styrene and also 24 g of tert-butyl acrylate was added during 150 min by metered addition. On completion of the initiator feed the batch was postpolymerized for 30 min and cooled down to 70° C. At this temperature, the mixture was stirred once again for 40 min. At this temperature, 0.75 g of a commercially available defoamer (Afranil T™ from BASF SE), 7.5 g of completely ion-free water and also 10.5 g of formic acid were added and the batch was cooled down to room temperature.

A finely divided polymer dispersion having a solids content of 20.2% by weight and an LT value (0.1%) of 94.9% was obtained.

Example 33

Synthesis of Dispersion 18

In a ground-joint 2 l flask equipped with stirrer and internal temperature measurement, 41.25 g of SGO 9 was acidified in a mixture of 2.73 g of formic acid and 200 g of water at 85° C. to form an aqueous cationic protective colloid. While stirring, 0.23 g of a 10% by weight iron(II) sulfate heptahydrate solution in water and 0.75 g of a 10% by weight ascorbic acid solution were added to the aqueous cationic protective colloid. This was followed by the metered addition at 85° C. of 7.72 g of a 17% by weight hydrogen peroxide solution during 180 min. Concurrently, a mixture of 8.44 g of styrene and 25.31 g of tert-butyl acrylate were added during 150 min by metered addition. On completion of the initiator feed the batch was postpolymerized for 30 min and cooled down to 75° C. Subsequently, 0.75 g of a 10% by weight ascorbic acid solution were added and stirred in for 20 min. This was followed by a renewed addition of 0.75 g of a 10% by weight ascorbic acid solution and also further stirring for 20 min. Finally, 0.75 g of a commercially available defoamer (Afranil T™ from BASF SE), 77.5 g of completely ion-free water and also 11 g of formic acid were added and the batch was cooled down to room temperature.

A finely divided polymer dispersion having a solids content of 19.35% by weight and an LT value (0.1%) of 91.8% was obtained.

Example 34

Synthesis of Dispersion 19

In a ground-joint 2 l flask equipped with stirrer and internal temperature measurement, 41.25 g of SGO 15 was acidified in a mixture of 3.55 g of formic acid and 175.0 g of water at 85° C. to form an aqueous amphoteric protective colloid. While stirring, 0.23 g of a 10% by weight iron(II) sulfate heptahydrate solution in water and 0.75 g of a 10% by weight ascorbic acid solution were added to the aqueous amphoteric protective colloid. This was followed by the metered addition at 85° C. of 6.62 g of a 17% by weight hydrogen peroxide solution during 150 min. Concurrently, a mixture of 8.44 g of styrene and 25.31 g of tert-butyl acrylate were added during 120 min by metered addition. On completion of the initiator feed the batch was postpolymerized for 30 min and cooled down to 75° C. Subsequently, 0.75 g of a 10% by weight ascorbic acid solution were added and stirred in for 20 min. This was followed by a renewed addition of 0.75 g of a 10% by weight ascorbic acid solution and also further stirring for 20 min. Finally, 0.75 g of a commercially available defoamer (Afranil T™ from BASF SE), 102.5 g of completely ion-free water and also 11 g of formic acid were added and the batch was cooled down to room temperature.

A finely divided polymer dispersion having a solids content of 19.8% by weight and an LT value (0.1%) of 96.4% was obtained.

Performance Testing of Polymer Dispersions:

To test the surface-sizing effect in use, the inventive dispersions and the comparative dispersions were applied by means of a laboratory size press to the test paper (100% reclaimed paper, 80 g/m$^2$ basis weight, unsized). The aqueous solution of a degraded corn starch was adjusted to the desired concentration. The dispersions to be tested were then added to the starch solution such that the size press liquor comprised 60 g/l of a degraded corn starch and 0.1-1.5 g/l of the dispersions.

The sizing effect of the dispersions 1 to 17 obtained as described in Examples 15 to 31 was then determined by surface application to the unsized test paper. To this end, the paper was passed twice through the size press, an average weight increase of about 65% being achieved.

The surface-sized papers were dried on a drying cylinder at 90° C. The papers were subsequently stored overnight in a conditioned room (23° C., 50% relative humidity) before the degree of sizing was determined.

To determine the degree of sizing of the surface-sized papers, the Cobb60 and Cobb120 values were determined according to DIN 53 132. The Cobb60 value is defined as the water absorption of the paper sheet in g/m$^2$ after contact with water and a contact time of 60 s (or 120 s in the case of the Cobb120 value). The lower the Cobb value, the better the sizing effect of the dispersion used. The test results are summarized in the following table:

Sizing Values:

| | $Cobb_{60}$-value [g/m$^2$] | | | $Cobb_{120}$-value [g/m$^2$] |
|---|---|---|---|---|
| | Amount Applied [g/l] | | | |
| | 0.6 | 0.8 | 1.1 | 1.1 |
| Dispersion 1 | 42 | 29 | 28 | 37 |
| Dispersion 2 | 36 | 30 | 24 | 38 |
| Dispersion 3 | 47 | 33 | 30 | 46 |
| Dispersion 4 | 47 | 32 | 27 | 29 |
| Dispersion 5 | 38 | 29 | 24 | 36 |
| Dispersion 6 | 38 | 30 | 25 | 34 |
| Dispersion 7 | 120 | 30 | 29 | 46 |
| Dispersion 8 | 53 | 36 | 28 | 41 |
| Dispersion 9 | 74 | 36 | 29 | 38 |
| Dispersion 10 | 48 | 29 | 28 | 40 |
| Dispersion 11 | 58 | 35 | 29 | 42 |
| Dispersion 12 | 41 | 30 | 28 | 45 |
| Dispersion 13 | 48 | 40 | 26 | 53 |
| Dispersion 14 | 92 | 32 | 29 | 40 |
| Dispersion 15 | 45 | 34 | 27 | 102 |
| Dispersion 16 | 52 | 29 | 25 | 37 |
| Dispersion 17 | 30 | 25 | 19 | 34 |
| Dispersion 18 | 36 | 30 | 26 | 40 |
| Dispersion 19 | 28 | 25 | 22 | 37 |

The invention claimed is:

1. A sizing agent comprising a finely divided, cationic or amphoteric, aqueous polymer dispersion obtained by emulsion polymerizing an ethylenically unsaturated monomer in the presence of a cationic or amphoteric protective colloid,
   wherein first the cationic or amphoteric protective colloid is prepared by polymerizing a monomer blend in the presence of at least one first polymerization initiator in an organic solvent in a pressurized reactor at a pressure of at least 1720 kPa and at a temperature of between 170° C. and 220° C., and wherein the monomer blend comprises an ethylenically unsaturated monomer comprising an amine group, to obtain a resin, then combining the resin with an acid and water to obtain the cationic or amphoteric protective colloid, thereafter performing an emulsion polymerization by introducing a monomer mixture into an aqueous medium comprising the cationic or amphoteric protective colloid and a second polymerization initiator, wherein the monomer mixture comprises an ethylenically unsaturated water insoluble monomer.

2. The sizing agent of claim 1, wherein the resin is obtained by polymerizing
   (a) from 0.1 to 99.9% by weight of at least one ethylenically unsaturated aromatic monomer;
   (b) from 0.1 to 99.9% by weight of at least one ethylenically unsaturated monomer comprising an amine group;
   (c) from 0 to 5% by weight of at least one ethylenically unsaturated monomer comprising an acid group; and
   (d) from 0 to 20% by weight of at least one non-ionic, ethylenically unsaturated monomer different from (a), the sum of (a)+(b)+(c)+(d) being 100% by weight.

3. The sizing agent of claim 1, wherein the resin is obtained by polymerizing
   (a) from 40 to 90% by weight of at least one optionally substituted styrene;
   (b) from 10 to 60% by weight of at least one ethylenically unsaturated monomer comprising an amine group;
   (c) from 0 to 5% by weight of at least one ethylenically unsaturated monomer comprising an acid group; and
   (d) from 0 to 20% by weight of at least one non-ionic, ethylenically unsaturated monomer different from (a), the sum of (a)+(b)+(c)+(d) being 100% by weight.

4. The sizing agent of claim 1, wherein the resin is obtained by polymerizing
   (a) from 40 to 90% by weight of styrene;
   (b) from 10 to 60% by weight of at least one compound selected from the group consisting of N,N-dimethylaminopropylmethacrylamide, N,N-dimethylaminoethyl methacrylate and N,N-dimethylaminoethyl acrylate;
   (c) from 0 to 5% by weight of acrylic acid, methacrylic acid, or both; and
   (d) from 0 to 5% by weight of stearyl acrylate.

5. The sizing agent of claim 1, wherein in the emulsion polymerizing the monomer mixture comprises
   (i) from 0 to 99.9% by weight of at least one ethylenically unsaturated aromatic monomer;
   (ii) from 0.1 to 100% by weight of at least one ester of an ethylenically unsaturated carboxylic acid;
   (iii) from 0 to 30% by weight of at least one vinyl ester of a linear or branched $C_1$- to $C_{18}$-carboxylic acid and
   (iv) from 0 to 30% by weight of at least one non-ionic or anionic ethylenically unsaturated monomer differing from (i), (ii) and (iii),
   the sum of (i)+(ii)+(iii)+(iv) being 100% by weight.

6. The sizing agent of claim 1, wherein in the emulsion polymerizing the monomer mixture comprises
   (i) from 0 to 50% by weight of at least one optionally substituted styrene;
   (ii) from 50 to 100% by weight of at least one $C_1$- to $C_{18}$-(meth) acrylate;
   (iii) from 0 to 30% by weight of at least one vinyl ester of a linear or branched $C_1$- to $C_{18}$-carboxylic acids and
   (iv) from 0 to 30% by weight of at least one non-ionic or anionic ethylenically unsaturated monomer differing from (i), (ii) and (iii),
   the sum of (i)+(ii)+(iii)+(iv) being 100% by weight.

7. The sizing agent of claim 1, wherein in the emulsion polymerizing the monomer mixture comprises:
   (i) from 0 to 50% by weight of styrene;
   (ii) from 50 to 100% by weight of n-butyl acrylate, tert-butyl acrylate or a mixture of n-butyl acrylate and tert-butyl acrylate in a weight ratio in a range of 3:1 to 1:3,
   (iv) from 0 to 30% by weight of 2-ethylhexyl acrylate, acrylic acid, or both,
   the sum of (i)+(ii)+(iv) being 100% by weight.

8. The sizing agent of claim 1, wherein the emulsion polymerizing is performed in the presence of from 0.1 to 5% by weight of at least one polymerization regulator.

9. The sizing agent of claim 1, wherein the polymerization of the monomer blend to form the resin and the emulsion polymerization to form the finely divided, cationic or amphoteric, aqueous polymer dispersion are performed separately in different reaction vessels.

10. A process of preparing a sizing agent comprising a finely divided, cationic or amphoteric, aqueous polymer dispersion, the process comprising:
    polymerizing a monomer blend in the presence of at least one first polymerization initiator in an organic solvent in a pressurized reactor at a pressure of at least 1720 kPa and at a temperature between 170° C. and 220° C., wherein the monomer blend comprises an ethylenically unsaturated monomer comprising an amine group, to obtain a resin; then
    combining the resin with an acid and water to obtain a cationic or amphoteric protective colloid; thereafter,
    performing an emulsion polymerization by introducing a monomer mixture into an aqueous medium comprising the cationic or amphoteric protective colloid and a second polymerization initiator, wherein the monomer mixture comprises an ethylenically unsaturated water insoluble monomer.

11. The sizing agent of claim 1, wherein the finely divided aqueous polymer dispersion is cationic.

12. The sizing agent of claim 1, wherein the finely divided aqueous polymer dispersion is amphoteric.

13. The sizing agent of claim 1, wherein in the emulsion polymerizing the monomer mixture comprises (i) from 0 to 29% by weight of the optionally substituted styrene.

14. The sizing agent of claim 1, wherein in the emulsion polymerizing the monomer mixture comprises (i) from 0 to 29% by weight of styrene.

15. The sizing agent of claim 1, wherein, in the emulsion polymerizing, the monomer mixture comprises (ii) from 71 to 100% by weight of n-butyl acrylate, tert-butyl acrylate or a mixture of n-butyl acrylate and tert-butyl acrylate in a weight ratio in a range of 3:1 to 1:3.

16. The sizing agent of claim 1, wherein the emulsion polymerizing is performed in the presence of from 0.1 to 5% by weight of at least one polymerization regulator.

17. The sizing agent of claim 1, wherein the emulsion polymerizing is performed in the presence of from 0.1 to 5% by weight of at least one polymerization regulator.

* * * * *